United States Patent [19]

Siegel

[11] Patent Number: 5,280,746
[45] Date of Patent: Jan. 25, 1994

[54] PRESSURE FLUID PUMP FOR A BRAKE SYSTEM

[75] Inventor: Heinz Siegel, Stuttgart, Fed. Rep. of Germany

[73] Assignee: Robert Bosch GmbH, Stuttgart, Fed. Rep. of Germany

[21] Appl. No.: 973,494

[22] Filed: Nov. 9, 1992

[30] Foreign Application Priority Data

Nov. 7, 1991 [DE] Fed. Rep. of Germany ....... 4136590

[51] Int. Cl.$^5$ .................. F01B 11/02; F16J 10/00
[52] U.S. Cl. .................. 92/169.1; 92/170.1; 417/540; 417/554
[58] Field of Search .......... 92/169.1, 162, 163, 92/170.1; 417/540, 554; 60/591, 592, 565

[56] References Cited

U.S. PATENT DOCUMENTS

| | | | |
|---|---|---|---|
| 1,092,782 | 4/1914 | Miles | 417/554 |
| 3,827,339 | 8/1974 | Rosen et al. | 92/169.1 X |
| 4,834,468 | 5/1989 | Kuwana et al. | 60/591 X |
| 4,867,044 | 9/1989 | Holtrop | 92/169.1 |
| 4,886,319 | 12/1989 | Nies et al. | 60/591 X |
| 5,067,881 | 11/1991 | Maehara | 417/554 X |

FOREIGN PATENT DOCUMENTS

| | | |
|---|---|---|
| 3236536 | 4/1984 | Fed. Rep. of Germany. |
| 1339657 | 9/1963 | France ................... 417/554 |

Primary Examiner—Edward K. Look
Assistant Examiner—Hoang Nguyen
Attorney, Agent, or Firm—Edwin E. Greigg; Ronald E. Greigg

[57] ABSTRACT

In a pump having a piston, supported displaceably in a pump cylinder, for aspirating a pressure fluid via a feed line and for expelling this pressure fluid into a line, particularly a brake line, the pump cylinder is intended to rest with a stop ring on a shoulder of the housing. This housing shoulder is adjoined by an annular chamber having a filter, which toward the housing forms an annular gap into which the feed line for pressure fluid discharges. The pump cylinder stop ring is intended to include a radius of curvature and to rest on the housing shoulder, also having a radius of curvature in the region of a bearing face.

6 Claims, 1 Drawing Sheet

PRESSURE FLUID PUMP FOR A BRAKE SYSTEM

BACKGROUND OF THE INVENTION

The present invention relates to improvements in pumps having a piston displaceably supported in a pump cylinder for aspirating a pressure fluid via a feed line and for expelling the pressure fluid into a line, particularly a brake line.

Pumps of this kind are used especially in ABS brake systems. As a rule, the pumps serve to pump brake fluid back into a fluid tank or reservoir.

It is self-evident that in operation of a brake system, dirt, abraded particles, oil deposits or the like collect in the brake fluid and can impair the operation of the brake system. For this reason, the brake fluid should be passed through filters during its circulation.

One such filter is located in the aforementioned pump, for instance, and shields the feed line from the suction chamber. Such a filter is suggested, for instance, in U.S. Pat. No. 4,887,870. Such a filter can also be found in German Published Patent Application No, 32 36 536. In the corresponding annular chamber, these filters form an annular gap toward the pump housing, so that fluid is present in this annular gap, upstream of the filter. However, since in the known pumps the pump cylinder rests with a stop ring, upstream of the annular chamber, on a housing shoulder with a precisely defined bearing surface area which cannot be altered, enlarging this annular gap presents considerable difficulties, yet the enlargement is desirable to improve the suction. In a larger annular gap, there is more fluid present upstream of the filter and subjected to the pumping action.

Altering the annular gap can be done only by shifting the bearing face outward, but this would necessitate enlarging the diameter of the pump cylinder and hence of the entire pump.

OBJECT AND SUMMARY OF THE INVENTION

It is a principal object of the present invention that the stop ring of the cylinder be embodied with a radius of curvature and resting on the shoulder, likewise having a radius of curvature, of the housing in the region of the bearing face.

Hence the bearing face is no longer radially disposed but rather extends in curved fashion. As a result, even in the corner region of the association between the stop ring and the shoulder, it is no longer necessary to form a chamfer on the stop ring, which was previously necessary in order to span the radius present in this corner of the shoulder in order to create a clean, plane bearing face between the stop ring and the shoulder.

While providing the curved embodiment of the bearing face, however, this bearing face cannot be shifted outward, into a region of the associated stop ring and shoulder that was heretofore inaccessible to the bearing face, without having to decrease the width of the bearing face. Neither the diameter of the pump cylinder nor the diameter of the corresponding stepped bore in the pump housing, nor other elements of the pump, need to be altered. From a production standpoint, this is a simple embodiment and thus entails only insignificant additional expenses to produce the radii of curvature. It is a simple solution even for pumps that are already in operation. There is no need to increase the space required for installation. The potential for notching action is kept slight by selecting large radii for the stop ring and the shoulder.

It is another object of the invention to make it possible to enlarge the annular gap substantially, providing overall improvement of the entire suction performance of the pump, especially at below-freezing temperatures.

It is still another object of the invention that the bearing face extends over the entire extent of the stop ring or shoulder. As a result, the possible area available for shifting the bearing face outward is optimally utilized.

Moreover, the radius of the shoulder should be slightly larger than the radius of the stop ring. As a result, a clean contact in the middle of the radius of curvature is attained in every case.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
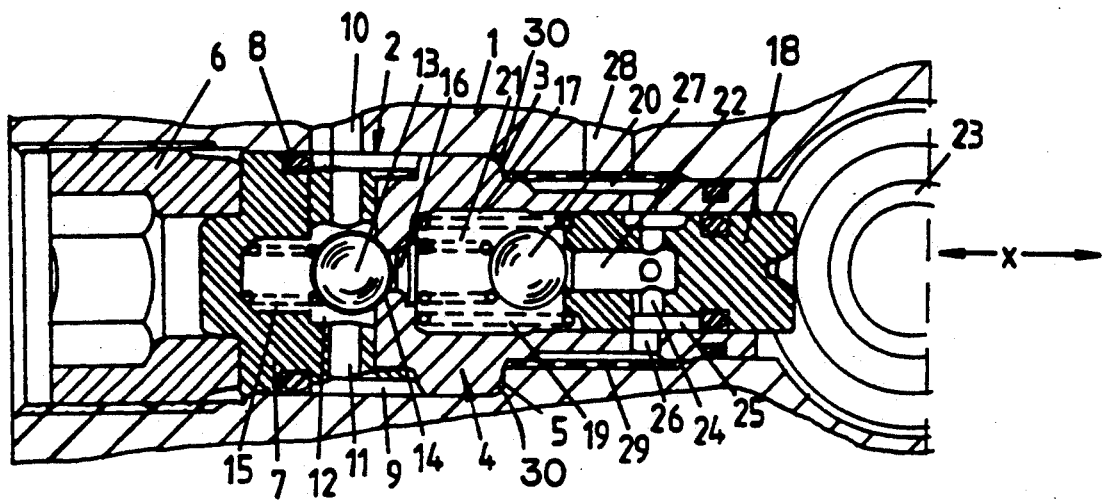
FIG. 1 is a fragmentary longitudinal section through a prior art pump element, for use in a brake line, for instance.

In FIG. 1, a stepped bore 2 is molded into a housing 1 of a pump element. Among other features, a shoulder 3 is embodied in this stepped bore 2, and a pump cylinder 4 rests with a stop ring 5 on this shoulder. The pump cylinder 4 is kept in this position for use by a screw 6 that is inserted into the stepped bore 2.

Also located between the screw 6 and the pump cylinder 4 is a valve insert 7, which is supported against the inner wall of the stepped bore 2 with a sealing ring 8. Facing the inner wall of the stepped bore 2, this valve insert 7 together with the pump cylinder 4 forms an annular conduit 9, from which a line 10 leads to a part, not shown in further detail, of a brake line.

On the other end, radial bores 11 connect the annular conduit 9 with a valve chamber 12, in which a ball 13 is disposed in a valve seat 14 and is supported on the other end against the valve insert 7, via a spring 15.

The ball 13 closes an opening 16 to a suction chamber 17 in the pump cylinder 4, whose volume is variable by an axial motion of a piston 18 in the direction x. The piston 18 is supported in the suction chamber 17 against a helical spring 19. A second ball 20, likewise supported against a spring 21, is also located in the suction chamber 17. This ball 20 closes an axial blind bore 22 in the piston 18, and this piston 18 is displaceable inside the pump cylinder 4. The displacement is effected by means of an eccentric 23, which since it is known is not described in further detail.

Figure 2:
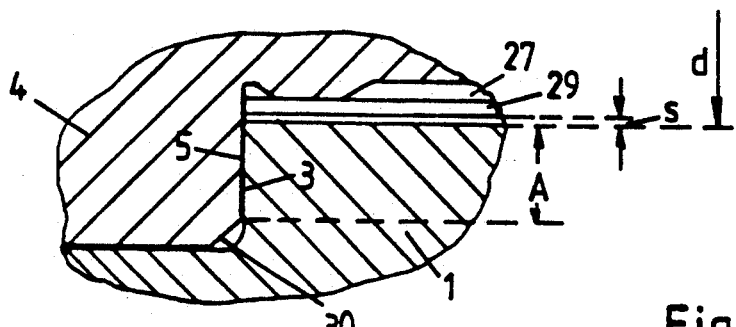
FIG. 2 is a detail on a larger scale of the prior art pump element of FIG. 1, in the prior art.

Aspiration of fluid upon the motion of the piston 18 in the direction x is effected via transverse bores 24, an annular conduit 25 between the piston 18 and the pump cylinder 4, via through-cuts 26 and via an annular chamber 27 between the housing 1 and the pump cylinder 4. This annular chamber 27 communicates with a feed line 28 for the fluid to be aspirated. An annular filter 29, which covers the feed line 28 with respect to the annular chamber 27, is also disposed in this annular chamber 27. As shown in FIG. 2, only a narrow annular gap S is formed between the filter 29 and the housing 1.

The mode of operation of the pump element is as follows:

Upon rotation of the eccentric 23, the piston 18 is displaced back and forth in the direction x. In this process, the volume of the suction chamber 17 varies. When the volume of the suction chamber 17 increases, the ball 20 lifts away from the axial blind bore 22, and fluid is aspirated from the feed line 28 through the blind bore, tie bores, annular conduit, through-cuts and annular chamber. This fluid flows through the filter 29.

If the piston 18 is displaced to the left, the ball 20 closes the axial blind bore 22, and the fluid is expelled from the suction chamber 17 through the opening 16 into the valve chamber 12, and the ball 13 lifts away from the valve seat 14 counter to the force of the spring 15. This fluid then reaches the brake line, not shown in detail, via the radial bores 11, the annular conduit 9, and the line 10.

In the present invention, the goal is to improve the suction by altering the annular gap S. FIG. 2 shows that in the prior art, the pump cylinder 4, with its stop ring 5, rests flat on the shoulder 3 of the housing 1. This prevents fluid from flowing from the high-pressure side in the annular conduit 9 to the suction chamber 27.

The pump cylinder 4 has a chamfer 30, which assures that the pump cylinder 4 will rest with its stop ring 5 cleanly and flatly on the shoulder 3. This bearing face A is calculated and optimized. However, the annular gap S is so small that the suction is impaired, since too little fluid is present upstream of the filter, distributed over the entire circumference.

Figure 3:
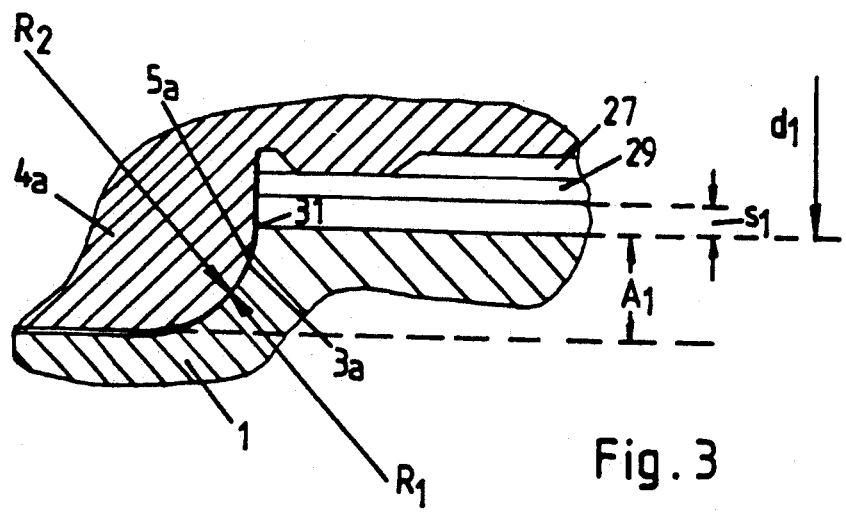
FIG. 3 is a detail on a larger scale of a pump element of FIG. 1 in accordance with the present invention.

It is accordingly proposed as in FIG. 3 that the annular gap S1 be enlarged substantially. For reasons of strength, the bearing face A must not be decreased in size. The total diameter of the pump cylinder 4 must also remain the same. If the annular gap S is then to be enlarged, this is done by enlarging the diameter d to d1 in the region of the annular chamber 27. This shifts the bearing face A outward. To that end, the shoulder 3a is now embodied as curved, with a radius of curvature R1. Instead of the chamfer 30, the stop ring 5a is also curved, with a radius of curvature R2. This means that the bearing face A now extends from the beginning of the curvature of the shoulder 3a or stop ring 5a as far as a shoulder edge 31. Since the bearing face A1 is intended to have the same length as the bearing face A, the annular gap S1 can be embodied as larger. Neither the pump cylinder 4 nor the screw 6 nor the other elements of the pump element need to be altered As is typical in snap ring connections, for instance, the radius R1 is slightly larger than the radius R2. In particular, this achieves a clean contact in the middle of the radius.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An improved pressure fluid pump for a brake system which comprises a pump piston displaceably supported in a pump cylinder disposed in a housing for aspirating a pressure fluid via a feed line and for expelling this pressure fluid into a pressure brake line, the pump cylinder resting with a stop ring (5a) on a shoulder (3a) of the housing, said shoulder having an inner diameter adjoined by an annular chamber provided with a filter and having an outer diameter, an annular gap being defined between the filter and the housing into which the pressure fluid feed line discharges, the improvement in which the stop ring (5a) of the pump cylinder (4a) includes a first radius of curvature (R2), said first radius of curvature beginning at an outer diameter of said stop ring and terminating in a distance to said filter, and the shoulder (3a) of the housing includes a complementary second radius of curvature (R1), said second radius of curvature beginning at said outer diameter of said shoulder and terminating substantially at said inner diameter of said shoulder, both curvatures sealingly resting towards each other in a smooth surface over an extend (A1) of said curvature.

2. A pump as defined by claim 1, in which the bearing face (A1) which includes said first and second radii of curvature extends over the entire extent of the stop ring (5a).

3. A pump as defined by claim 1, in which the bearing face (A1) which includes said first and second radii of curvature extends over the entire extent of the shoulder (3a).

4. A pump as defined by claim 1, in which said second radius of curvature (R1) of the shoulder (3a) is slightly larger than the first radius of curvature (R2) of the stop ring (5a).

5. A pump as defined by claim 2, in which said second radius of curvature (R1) of the shoulder (3a) is slightly larger than the first radius of curvature (R2) of the stop ring (5a).

6. A pump as defined by claim 3, in which said second radius of curvature (R1) of the shoulder (3a) is slightly larger than the first radius of curvature (R2) of the stop ring (5a).

* * * * *